United States Patent
Tamai et al.

(10) Patent No.: US 11,040,561 B2
(45) Date of Patent: Jun. 22, 2021

(54) INK AND PROCESSING LIQUID SET, IMAGE FORMING METHOD, AND IMAGE FORMING DEVICE

(71) Applicants: Takashi Tamai, Kanagawa (JP); Dongsik Jang, Tokyo (JP); Atsufumi Hanazawa, Tokyo (JP); Satoshi Takahashi, Kanagawa (JP); Yoshiki Yanagawa, Telford (GB); Tsutomu Maekawa, Ibaraki (JP); Yukitaka Watarai, Ebina (JP)

(72) Inventors: Takashi Tamai, Kanagawa (JP); Dongsik Jang, Tokyo (JP); Atsufumi Hanazawa, Tokyo (JP); Satoshi Takahashi, Kanagawa (JP); Yoshiki Yanagawa, Telford (GB); Tsutomu Maekawa, Ibaraki (JP); Yukitaka Watarai, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 188 days.

(21) Appl. No.: 16/351,588

(22) Filed: Mar. 13, 2019

(65) Prior Publication Data
US 2019/0283479 A1 Sep. 19, 2019

(30) Foreign Application Priority Data

Mar. 15, 2018 (JP) .............................. JP2018-048211
Dec. 7, 2018 (JP) .............................. JP2018-230085

(51) Int. Cl.
*B41M 5/00* (2006.01)
*B41J 11/00* (2006.01)
(Continued)

(52) U.S. Cl.
CPC ........ *B41M 5/0023* (2013.01); *B41J 11/0015* (2013.01); *C09D 11/102* (2013.01); *C09D 11/107* (2013.01); *C09D 11/54* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2010/0236447 A1* 9/2010 Sakai ..................... C09D 11/54
106/31.6
2011/0187789 A1* 8/2011 Saito ....................... B41J 2/015
347/21
(Continued)

FOREIGN PATENT DOCUMENTS

EP 3 196 260 A1 7/2017
EP 3 290 217 A1 3/2018
(Continued)

OTHER PUBLICATIONS

Extended European Search Report dated Jul. 31, 2019 in Patent Application No. 19161732.3, 5 pages.

*Primary Examiner* — Manish S Shah
(74) *Attorney, Agent, or Firm* — Oblon, McClelland, Maier & Neustadt, L.L.P.

(57) ABSTRACT

An ink and processing liquid set contains a processing liquid to be applied to a recording medium, the processing liquid including a multivalent metal salt and an ink to be applied to an area of the recording medium where the processing liquid has been applied, the ink including a urethane resin, a styrene-acrylic resin, and a pigment, wherein the following relations are satisfied: $0.5 \leq B/C \leq 0.7$, where B represents a static surface tension of the ink and C represents a static surface tension of the processing liquid; and $0.5 \leq E/D \leq 0.9$, and 35 (mN/m)$\leq E \leq 55$ (mN/m), where D represents a
(Continued)

dynamic surface tension at 15 ms of the processing liquid and E represents a dynamic surface tension at 1500 ms of the processing liquid.

20 Claims, 3 Drawing Sheets

(51) Int. Cl.
*C09D 11/102* (2014.01)
*C09D 11/107* (2014.01)
*C09D 11/54* (2014.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 2/04588; B41J 2/04595; B41J 2/04586; B41J 2/14274; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/01; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/227

See application file for complete search history.

(56) References Cited

U.S. PATENT DOCUMENTS

| | | | |
|---|---|---|---|
| 2012/0268521 A1* | 10/2012 | Moribe | B41J 2/01 347/21 |
| 2014/0069295 A1* | 3/2014 | Fujii | B41J 2/17503 347/100 |
| 2015/0258796 A1 | 9/2015 | Tamai et al. | |
| 2015/0259567 A1 | 9/2015 | Tamai et al. | |
| 2016/0024323 A1 | 1/2016 | Tamai et al. | |
| 2016/0052302 A1* | 2/2016 | Willems | C09D 11/322 347/101 |
| 2016/0137862 A1 | 5/2016 | Tamai et al. | |
| 2016/0144620 A1 | 5/2016 | Masuda et al. | |
| 2016/0144634 A1* | 5/2016 | Emamjomeh | B41J 11/002 347/19 |
| 2016/0160161 A1 | 6/2016 | Tamai et al. | |
| 2016/0185110 A1 | 6/2016 | Masuda et al. | |
| 2017/0015102 A1 | 1/2017 | Nagashima et al. | |
| 2018/0094152 A1 | 4/2018 | Sakaguchi et al. | |
| 2018/0126728 A1 | 5/2018 | Saito et al. | |
| 2018/0244935 A1 | 8/2018 | Sakaguchi et al. | |

FOREIGN PATENT DOCUMENTS

| | | |
|---|---|---|
| JP | 2006-335858 | 12/2006 |
| JP | 2010-065170 | 3/2010 |
| JP | 2017-137461 | 8/2017 |
| WO | WO 2012/132305 A1 | 10/2012 |
| WO | WO2012/132403 A1 | 10/2012 |

* cited by examiner

);
INK AND PROCESSING LIQUID SET, IMAGE FORMING METHOD, AND IMAGE FORMING DEVICE

CROSS-REFERENCE TO RELATED APPLICATION

This patent application is based on and claims priority pursuant to 35 U.S.C. § 119 to Japanese Patent Application No 2018-048211 and 2018-230085, filed on Mar. 15, 2018 and Dec. 7, 2018, respectively, in the Japan Patent Office, the entire disclosure of which is hereby incorporated by reference herein.

BACKGROUND

Technical Field

The present invention relates to an ink and processing liquid set, an image forming method, and an image forming device.

Description of the Related Art

In the inkjet recording method, a small amount of ink droplets are discharged and attached onto a recording medium, typically paper, from fine nozzles to record texts and images thereon. Inkjet printers employing the inkjet recording method are relatively quiet and capable of printing color images with ease, so that they are now widely used at home.

Since the inkjet recording method has advantages of operating with variable printing and a variety of recording media, it is also widely chosen for commercial printing. In the field of commercial printing, various kinds of paper are used for printing and typically classified into plain paper and coated paper, which require different features of ink to secure optical density (OD) for plain paper and gloss for coated paper.

Therefore, it is extremely difficult to satisfy the demanded levels of properties for images and texts such as color reproducibility, abrasion resistance, durability, light resistance, dryness, feathering, color bleed, beading, duplex printing, and discharging stability. Accordingly, inks are selected depending on properties prioritized to a particular application in fact.

SUMMARY

According to embodiments of the present disclosure, provided is an ink and processing liquid set contains a processing liquid to be applied to a recording medium, the processing liquid comprising a multivalent metal salt and an ink to be applied to an area of the recording medium where the processing liquid has been applied, the ink comprising a urethane resin, a styrene-acrylic resin, and a pigment, wherein the following relations are satisfied: $0.5 \leq B/C \leq 0.7$, where B represents a static surface tension of the ink and C represents a static surface tension of the processing liquid; and $0.5 \leq E/D \leq 0.9$, and 35 (mN/m)$\leq E \leq$55 (mN/m), where D represents a dynamic surface tension at 15 ms of the processing liquid and E represents a dynamic surface tension at 1500 ms of the processing liquid.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
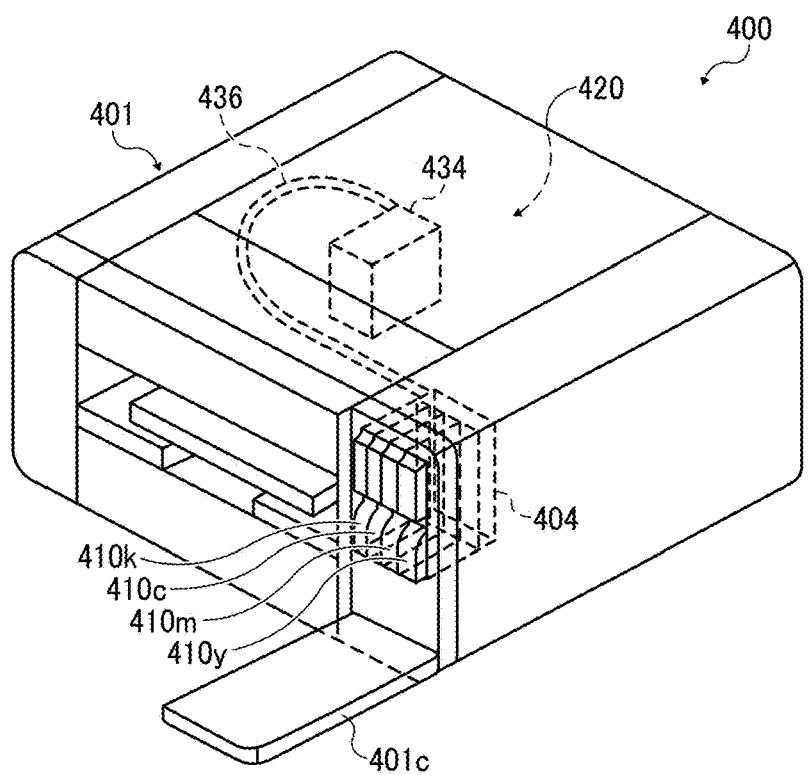
FIG. 1 is a schematic diagram of a perspective view illustrating an example of the image forming device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Hereinafter, an ink and processing liquid set, an image forming method, and an image forming device relating to the present disclosure are described with reference to the accompanying drawings.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified. It is to be noted that the following embodiments are not limiting the present disclosure and any deletion, addition, modification, change, etc., can be made within a scope in which man in the art can conceive including other embodiments, and any of which is included within the scope of the present disclosure as long as the effect and feature of the present disclosure are demonstrated.

A recording medium has been proposed on which a material is preliminarily coated to attach a coloring material in an ink to the recording medium when an ink image is formed on the surface of the recording medium. Also, another recording medium has been proposed on which a white pigment or a water-soluble polymer is coated.

However, since special treatment for such coating is expensive, those recording media are limited to special applications, for example, photographic image output and has failed to become popular.

In an attempt to deal with general recording media, an inkjet recording method has been proposed which includes preliminarily spraying or applying a processing liquid capable of aggregating a coloring material onto a recording medium and thereafter spraying an ink onto the processing liquid sprayed or applied portion to print an image having good image density and saturation for both of plain paper and coated paper for inkjet.

The kind, amount, and properties of the coagulant contained in the processing liquid are selected based on polarity and a dispersion method of the coloring material in the ink. For example, when the coloring material pigment is dispersed in an anionic water-soluble resin, a cationic polymer, a cationic particulate, an organic acid, and a multivalent metal salt demonstrate aggregation property.

However, if the aggregation reaction is too quick, the processing liquid aggregate the ink before the ink droplet permeates and spreads on the surface of the recording medium so that the ink dot diameter may not expand. Therefore, although beading ascribable to moving of the ink droplet after the landing of the ink droplet can be effectively reduced, image density or saturation may deteriorate. Conversely, if the aggregation reaction is too slow, for a recording medium without a surface coated layer such as plain paper, ink permeates into the recording medium, resulting in poor coloring and occurrence of beading.

In addition, if a coagulant contained in the processing liquid is excessively reactive, an application member such as a roller to apply the processing liquid may deteriorate or rust. Therefore, it is not preferable to increase density or the amine value of the coagulant or excessively decrease pH.

Various methods have been proposed for this drawback. For example, to reduce color bleed and feathering, a printing method has been proposed which includes causing an acceptance solution containing a particular metal salt and at least one kind of resins having a hydrophilic group and/or an anionic resin emulsion to attach to a recording medium and applying an inkjet ink composed of an aqueous solvent containing a pigment and an anionic resin emulsion one of which has a phosphoric organic group to the part where the acceptance solution is attached.

Regarding this printing method, reduction of color bleed and feathering is investigated but a drawback of a high performance continuous printer, which is blocking caused by reeling after printing or stacking of printed matter, is not considered. Also, for the configurations of Examples, blocking clearly occurs. In addition, fixability has not been discussed.

According to embodiments of the present disclosure, an improved ink and processing liquid set is provided which is capable of reducing the occurrence of color bleed, demonstrating good fixability, diminishing occurrence of blocking ascribable to winding up or stacking after image formation.

The present inventors made an investigation of an impact on beading, color bleed, and blocking for a recording medium by changing wettability and a resin contained in a processing liquid and an ink. As a result, the present inventors have found that when the surface tension of an ink is lower than that of a processing liquid, irrespective of drying of the processing liquid, the ink wet-spreads on a recording medium while maintaining an aggregation power, which increases image density and saturation, thereby reducing beading and color bleed. The present inventors have also found that blocking can be reduced while improving fixability.

According to embodiments of the present disclosure, the occurrence of color bleed is reduced, good fixability is demonstrated, and the occurrence of blocking ascribable to winding up or stacking after image formation is also reduced. In addition, the present disclosure demonstrates particularly good impacts on low-absorptive recording media such as offset coated paper and non-permeable recording media. Further, the present disclosure can reduce occurrence of beading and enhance storage stability.

Ink and Processing Liquid Set

An ink and processing liquid set contains a processing liquid to be applied to a recording medium, the processing liquid containing a multivalent metal salt and an ink to be applied to an area of the recording medium where the processing liquid has been applied, the ink containing a urethane resin, a styrene-acrylic resin, and a pigment, wherein the following relations are satisfied:

$$0.5 \leq B/C \leq 0.7,$$

where B represents the static surface tension of the ink and C represents the static surface tension of the processing liquid; and $$0.5 \leq E/D \leq 0.9, \text{ and } 35 \text{ (mN/m)} \leq E \leq 55 \text{ (mN/m)},$$

where D represents the dynamic surface tension at 15 ms of the processing liquid and E represents the dynamic surface tension at 1500 ms of the processing liquid.

The details are described below.

The ink and processing liquid set is also simply referred to as the ink set.

Surface Tension

According to the ink set of the present disclosure, the static surface tension B of the ink and the static surface tension C of the processing liquid satisfy the following relation: $0.5 \leq B/C \leq 0.7$. Within this range, when the ink is applied to a recording medium to which the processing liquid is applied, the ink can uniformly wet-spread on the recording medium, thereby enhancing image quality.

In addition, when the static surface tension B of the ink is lower than the static surface tension C of the processing liquid, irrespective of whether the processing liquid is dried or not, the ink can wet-spread on the recording medium without losing the aggregation power of the processing liquid. This reduces occurrence of beading and color bleed due to the balance of wet-spreading of the ink itself.

When the ratio B/C is less than 0.5, the preliminarily coated processing liquid quickly wet-spreads, but the ink has poor wet-spreading. This causes degradation of image quality such as voids. When the ratio B/C surpasses 0.7, the preliminarily coated processing liquid does not wet-spread, but the ink quickly wet-spreads, which easily causes aggregation difference, leading to density unevenness.

For example, the kind and the content of the component contained in the ink and the processing liquid are controlled to satisfy the relation mentioned above between the static surface tension B of the ink and the static surface tension C of the processing liquid.

The static surface tension B of the ink is preferably 35 mN/m or less and more preferably 32 mN/m or less at 25 degrees C. in terms that the ink is suitably leveled on a recording medium and the drying time of the ink is shortened.

In addition, since the dynamic surface tension D at 15 ms of the processing liquid and the dynamic surface tension E at 1500 ms of the processing liquid satisfy the relations:

$$0.5 \leq E/D \leq 0.9 \text{ and } 35 \text{ [mN/m]} \leq E \leq 55 \text{ [mN/m]},$$

it is possible to uniformly apply the processing liquid to a recording medium.

The method of applying the processing liquid can be appropriately changed. For example, due to the relations mentioned above, the processing liquid can be uniformly applied by roller application.

When E/D is less than 0.5, the ink does not easily penetrate through a recording medium, which causes application unevenness. When E/D surpasses 0.9, the ink excessively penetrates through a recording medium, it is not possible to obtain a desired aggregation power.

If E is less than 35 [mN/m], the processing liquid excessively penetrates through a recording medium, and the aggregation power due to the processing liquid deteriorates, thereby degrading the image quality. When E exceeds 55 [mN/m], the processing liquid cannot be uniformly applied onto the recording medium, resulting in application unevenness.

For example, the kind and the content of the component contained in the processing liquid are controlled to satisfy the relation mentioned above between the dynamic surface tension D at 15 ms of the processing liquid and the dynamic surface tension E at 1500 ms of the processing liquid.

The dynamic surface tension A at 15 ms of the ink and the static surface tension B of the ink preferably satisfy the following relation: $1.5 \leq A/B \leq 2$.

The ink satisfying this relation has an advantage that the ink quickly wet-spreads and permeates on a recording medium.

For example, the kind and the content of the component contained in the ink and the processing liquid are controlled to satisfy the relation mentioned above between the dynamic surface tension A at 15 ms of the ink and the static surface tension B of the ink.

Dynamic surface tension of each of the processing liquid and the ink are measured under the conditions of a temperature of 25 degrees C. and a bubble lifetime of 15 msec using a portable surface tensiometer (SITA DynoTester, manufactured by EKO SEIKI Corporation). Static surface tension of each of the processing liquid and the ink is measured at 25 degrees C. using a surface tensiometer (DY 300, manufactured by Kyowa Interface Co., Ltd.). A to E are presented in [mN/m].

Ink

The ink of the present disclosure contains resins (urethane resin and styrene-acrylic resin), a pigment, and other optional components such as an organic solvent, water, an additive, a surfactant, a defoaming agent, a preservatives and fungicides, a corrosion inhibitor, and a pH regulator.

Resin

The ink of the present disclosure contains a urethane resin and a styrene-acrylic resin. These urethane resin and styrene-acrylic resin secure good fixability and high image quality for coated paper.

Urethane Resin

Due to the urethane resin in the ink of the present embodiment, abrasion resistance and fixability can be improved.

The volume average particle diameter of the urethane resin is preferably from 10 to 30 nm. When the volume average particle diameter is 10 to 30 nm, the urethane resin enters the gaps between the styrene-acrylic resin and the pigment so that the cohesion between the pigment and the resin can be enhanced, thereby enhancing abrasion resistance and fixability.

There is no specific limitation to the molecular weight, which can be suitably selected to suit to a particular application.

The proportion of the urethane resin in the ink is preferably from 1.0 to 5.0 percent by mass.

Within this range, fixability is secured and image quality can be enhanced.

When the proportion is 1.0 percent by mass or more, cohesion in the ink layer and between the ink layer and the recording medium can be enhanced, whereby the abrasion resistance can be enhanced.

When the proportion is 5.0 percent by mass or less, occurrence of blocking can be reduced and storage stability of the ink can be secured.

The glass transition temperature Tg of the urethane resin is preferably 60 degrees C. or lower. This increases cohesion between the pigment, the resin, and the recording medium, thereby increasing fixability.

Styrene-Acrylic Resin

Due to the styrene-acrylic resin contained in the ink of the present embodiment, image quality and abrasion resistance are improved.

Furthermore, due to the styrene-acrylic resin, occurrence of blocking ascribable to winding-up and stacking after printing can be reduced.

The volume average particle diameter of the styrene-acrylic resin is preferably from 40 to 60 nm.

When the volume average particle diameter is from 40 to 60 nm, roughness of the obtained print surface can be reduced. Therefore, gloss of the smooth print surface is improved and optical density (OD) and saturation can be enhanced.

Also, within the above-mentioned range, it is possible to improve not only the image quality but also fixability.

There is no specific limitation to the molecular weight, which can be suitably selected to suit to a particular application.

In terms of ensuring fixability and enhancing the image quality, the proportion of the styrene acrylic resin in the ink is preferably from 1.0 to 10.0 percent by mass and more preferably from 1.5 to 10.0 percent by mass. Furthermore, when the proportion is 1.0 percent by mass or more, roughness of the surface is reduced and in addition, abrasion resistance is enhanced. When the proportion is 10.0 percent by mass or less, blocking can be reduced.

In addition, it is preferable that the proportion of the styrene-acrylic resin in the ink be higher than that of the urethane resin. When the proportion of the styrene-acrylic resin is higher than that of the urethane resin, blocking and beading can be reduced and in addition, image quality and fixability can be enhanced.

Other Resins

In addition to urethane resins and styrene-acrylic resins, other resins can be added to suit to a particular application. Such other specific examples include, but are not limited to, polyester resins, acrylic resins, vinyl acetate resins, styrene-based resins, butadiene-based resins, styrene-butadiene-based resins, vinyl chloride-based resins, and acrylic-silicone-based resins. Resin particles formed of these resins may be also used. It is possible to mix a resin emulsion in which such resin particles are dispersed in water as a dispersion medium with materials such as a coloring material and an organic solvent to obtain an ink. It is possible to use suitably-synthesized resin particles. Alternatively, the resin particle is available on the market.

The volume average particle diameter of the other resin particles is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

Measuring Volume Average Particle Diameter

The volume average particle diameter can be measured by using, for example, a particle size analyzer (Nanotrac Wave-UT151, manufactured by MicrotracBEL Corp.).

Pigment

As the pigment, inorganic pigments or organic pigments can be used. These can be used alone or in combination. In addition, it is possible to use a mixed crystal as the pigment.

As the pigments, for example, black pigments, yellow pigments, magenta pigments, cyan pigments, white pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by the known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

In addition, the pigment, dyes can be also used as the coloring material.

The dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the pigment in the ink is preferably from 0.1 to 25 percent by mass and more preferably from 1 to 20 percent by mass in terms of enhancement of image density, fixability, and discharging stability.

Method of Dispersing Pigment

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as a sulfone group and a carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc., depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Preparation of Pigment

The ink can be obtained by mixing a pigment with materials such as water and an organic solvent. It is also possible to mix the pigment with water, a dispersant, etc., to prepare a pigment dispersion and thereafter mix the pigment dispersion with a material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT 151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with a filter, a centrifuge, etc., to remove coarse particles followed by degassing.

Organic Solvent

There is no specific limitation to the organic solvent for use in the present disclosure. For example, water-soluble organic solvents can be used. Examples are polyols, ethers such as polyol alkylethers and polyol arylethers, nitrogen-containing heterocyclic compounds, amides, amines, and sulfur-containing compounds.

Specific examples of the polyol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl 1,3-butanediol, trethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of nitrogen-containing heterocyclic compounds include, but are not limited to, 2-pyrolidone, N-methyl-2-pyrolidone, N-hydroxyethyle-2-pyrolidone, 1,3-dimethyl-2-imidazoline, ε-caprolactam, and γ-butylolactone.

Specific examples of the amide include, but are not limited to, formamide, N-methyl formamide, N,N-dimethylformamide, 3-methoxy-N,N-dimethyl propionamide, and 3-buthoxy-N,N-dimethylpropionamide.

Specific examples of the amine include, but are not limited to, monoethanol amine, diethanol amine, and triethyl amine.

Specific examples of the sulfur-containing compounds include, but are not limited to, dimethyl sulphoxide, sulfolane, and thiodiethanol.

Also, for example, propylene carbonate, ethylene carbonate, etc., can be used as the organic solvent.

To serve as a humectant and impart a good drying property, it is preferable to use an organic solvent having a boiling point of 250 degrees C. or lower.

Polyol compounds having eight or more carbon atoms and glycol ether compounds are also suitable as the organic solvent.

Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of the ink, the proportion is preferably from 10 to 60 percent by mass and more preferably from 20 to 60 percent by mass.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Additive

Ink may further optionally include a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, silicone-based surfactants not decomposed even at high pH environment are preferable. The silicone-based surfactants include, for example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or a polyoxyethylene polyoxypropylene group because these demonstrate good properties as aqueous surfactants. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactants do not easily produce foams.

Specific examples of the perfluoroalkyl sulfonic acid compounds include, but are not limited to, a perfluoroalkyl sulfonic acid and a salt of perfluoroalkyl sulfonic acid. Specific examples of the perfluoroalkyl carboxylic acid compounds include, but are not limited to, a perfluoroalkyl carboxylic acid and a salt of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application.

Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropyl ene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

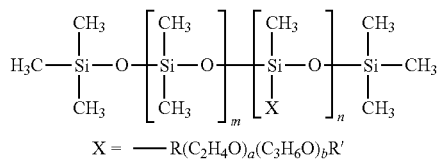

$X = ---R(C_2H_4O)_a(C_3H_6O)_bR'$

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co, Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK-Chemie GmbH), and TSF4440, TSF4452, and TSF4453 (all manufactured by Momentive Performance Materials Inc.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical formula F-1 or Chemical formula F-2 is more preferable.

$CF_3CF_2(CF_2CF_2)_m---CH_2CH_2O(CH_2CH_2O)_nH$  Chemical formula F-1

In the compound represented by Chemical formula F-1, m is preferably 0 or an integer of from 1 to 10 and n is preferably 0 or an integer of from 1 to 40.

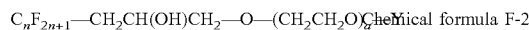
$C_nF_{2n+1}---CH_2CH(OH)CH_2---O---(CH_2CH_2O)_aY$  Chemical formula F-2

In the compound represented by Chemical formula F-2, Y represents H, $C_mF_{2m+1}$, where m represents an integer of from 1 to 6, $CH_2CH(OH)CH_2---C_mF_{2m+1}$, where m represents an integer of from 4 to 6, or $C_pH_{2p+1}$, where p is an integer of from 1 to 19. "n" represents an integer of from 1 to 6. "a" represents an integer of from 4 to 14.

As the fluorochemical surfactant, products available on the market may be used.

Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

As the surfactant contained in the ink, a fluorochemical surfactant represented by the following Chemical formula 1 is particularly preferable. "n" represents an integer of from 1 to 40.

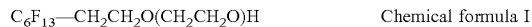
$C_6F_{13}---CH_2CH_2O(CH_2CH_2O)_nH$  Chemical formula I

The surfactant represented by Chemical formula 1 illustrated above can enhance wettability and impart more uniform ink wettability to a recording medium and contribute to obtaining a more robust image.

The proportion of the surfactant in ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Property of Ink

Properties of the ink are not particularly limited and can be suitably selected to suit to a particular application. For example, viscosity, surface tension, pH, etc., are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes pH of the ink is preferably from 7 to 12 and more preferably from 8 to 11 in terms of prevention of corrosion of metal material in contact with liquid.

Processing Liquid

The processing liquid of the present disclosure contains a multivalent metal salt and other optional articles such as water, an organic solvent, a surfactant, a defoaming agent, a pH regulator, a preservatives and fungicides, and a corrosion inhibitor. Water, the organic solvent, the surfactant, the defoaming agent, the pH regulator, the preservatives and fungicides, and the corrosion inhibitor can be the same material as those for use in the ink. Also, other material for use in known processing liquid can be used.

Multivalent Metal Salt

The multivalent metal salt is constituted of particular multivalent metal salt ions and anionic ions bonded with these multivalent metal ions. The multivalent metal salt for use in the present embodiment can serve as a coagulant and has a solid content aggregating action.

Specific examples of the multivalent metal salt include, but are not limited to, a magnesium salt, a calcium salt, a nickel salt, an aluminum salt, a boron salt, and a zinc salt. Of these, a magnesium salt and a calcium salt are preferable and a magnesium salt is particularly preferable.

Specific examples of the calcium salt and magnesium salt include, but are not limited to, calcium chloride, magnesium chloride, calcium bromide, magnesium bromide, calcium nitrate, magnesium nitrate, and magnesium sulfate.

In addition to the multivalent metal salts mentioned above, it may contain an organic acid metal salt.

Specific examples of the organic acid metal salt include, but are not limited to, calcium salts and magnesium salts of pantothenic acid, propionic acid, ascorbic acid, acetic acid, and lactic acid.

The proportion of the multivalent metal salt in the processing liquid is preferably from 10 to 40 percent by mass. When the proportion is 10 percent by mass or more, the solid portion tends to agglomerate, and occurrence of color bleed and beading is diminished. When the proportion is 40 percent by mass or less, precipitation of a polyvalent metal salt at the time of water evaporation can be reduced.

Other Properties

In addition, in the present disclosure, it is preferable that the initial viscosity X of the processing liquid and the viscosity Y of the processing liquid at the time of 10 percent moisture evaporation satisfy $1.5 \leq Y/X \leq 4$. Within this range, fluctuation of the defect caused by viscosity increase ascribable to evaporation can be reduced.

Viscosity can be measured by, for example, a rotatory viscometer (RE-80L, manufactured by TOKI SANGYO CO., LTD.).

Recording Medium

The recording medium for use in recording is not particularly limited.

Specific examples include, but are not limited to, plain paper, gloss paper, special paper, cloth, film, transparent sheets, and printing paper for general purposes.

Recorded Matter

The recorded matter obtained according to the present disclosure is formed on a recording medium with the ink set of the present disclosure.

The recorded matter is obtained by an inkjet recording device executing an inkjet recording method.

Recording Device and Recording Method

The image forming method of the present disclosure includes applying the processing liquid to a recording medium and applying an ink to an area of the recording medium to which the processing liquid is applied. The image forming device of the present disclosure includes a processing liquid application device for applying the processing liquid to a recording medium and an ink application device for applying an ink to an area of the recording medium to which the processing liquid is applied.

The ink set of the present disclosure can be suitably used for various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices, etc.).

In the present disclosure, the recording device and the recording method respectively represent a device capable of discharging ink, various processing liquids, etc., to a recording medium and a method of recording utilizing the device. The recording medium means an article to which ink or various processing liquids can be attached temporarily or permanently.

The recording device may further optionally include a device relating to feeding, conveying, and ejecting a recording medium and other devices referred to as a pre-processing device, a post-processing device, etc., in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium having, for example, AO size and a continuous printer capable of using continuous paper rolled up in a roll-like form as a recording medium.

Figure 2:
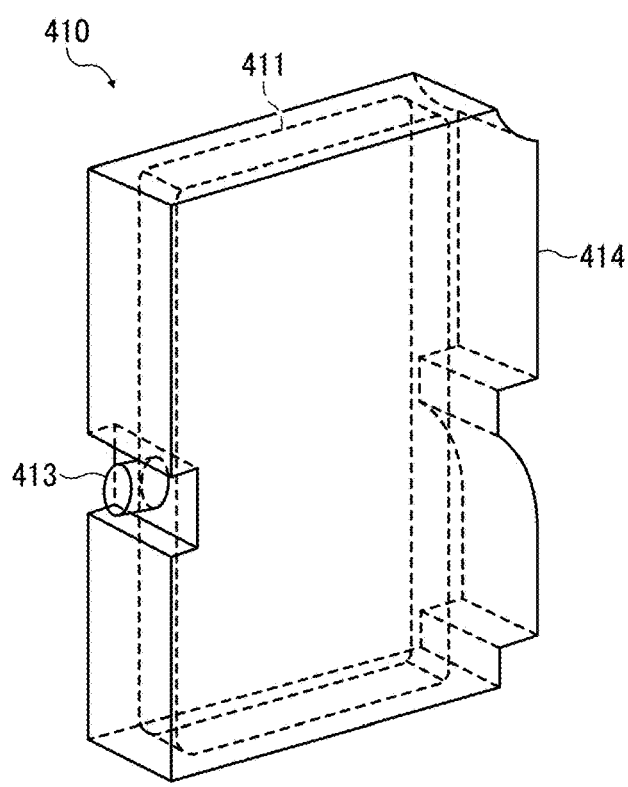
FIG. 2 is a diagram of a perspective view illustrating a main tank.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit (ink container) 411 of each main tank 410 (410$k$, 410$c$, 410$m$, and 410$y$) for each color of black (K), cyan (C), magenta (M), and yellow (Y) is made of, for example, a packaging member such as an aluminum laminate film.

The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401$c$ is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

This recording device may include not only a portion to discharge ink but also devices referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Notably, the ink set is applicable not only to the inkjet print method but can be widely applied in other methods.

Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

The usage of the ink set of the present disclosure is not particularly limited and can be suitably selected to suit to a particular application. For example, the ink can be used for printed matter, a paint, a coating material, and foundation.

The ink can be used to form two-dimensional texts and images and furthermore a three-dimensional solid object (solid freeform fabrication object) as a material for 3D modeling. The solid fabrication apparatus to fabricate a solid fabrication object can be any known device with no particular limit. For example, the apparatus includes a container, a supplying device, and a discharging device, a drier, etc., of ink. The solid fabrication object includes an object manufactured by repeated ink coating. In addition, the solid fabrication object includes a molded processed product manufactured by processing a structure having a substrate such as a recording medium to which the ink is applied. The molded processed product is manufactured from recorded matter or a structure having a sheet-like form, film-like form, etc., by, for example, heating drawing or punching. The molded processed product is suitably used for articles which are molded after surface-decorating. Examples are gauges or operation panels of vehicles, office machines, electric and electronic devices, cameras, etc.

Image forming, recording, printing, print, etc., in the present disclosure represent the same meaning. Also, recording media, media, substrates in the present disclosure have the same meaning.

Figure 3:
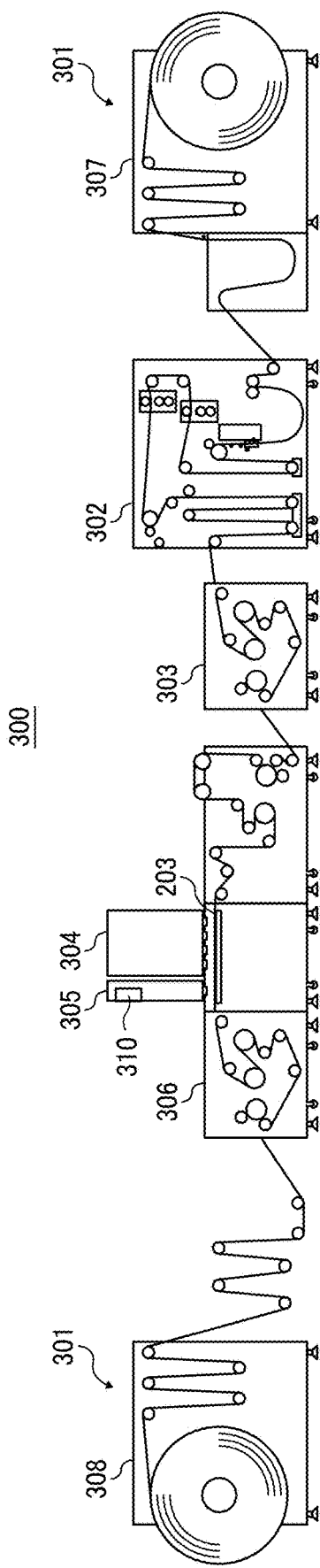
FIG. 3 is a schematic diagram illustrating another example of the image forming device according to an embodiment of the present disclosure.

An embodiment of the image forming device relating to the present disclosure is described with reference to FIG. 3. FIG. 3 is a schematic diagram illustrating a line-type inkjet recording device to which the present disclosure is applied.

An inkjet recording device 300 to which the present disclosure is applied includes a recording medium conveying unit 301, a processing unit 302 to apply the processing liquid to a recording medium 203, a post-processing drying unit 303 to dry the recording medium 203 to which the processing liquid is applied, and an image forming unit 304 including an ink accommodating unit 310. Post-processing is optional and the inkjet recording device may include a post-processing unit 305 to apply a post-processing liquid to the recording medium 203 after image formation and a post-processing drying unit 306 to dry the recording medium 203 to which the post-processing liquid is applied.

The recording medium conveying unit 301 includes a sheet feeder 307, multiple conveying rollers, and a rolling-up unit 308. The recording medium 203 illustrated in FIG. 3 is rolled continuous paper (roll paper), reeled out from the sheet feeder 307 by the conveying rollers, conveyed along on a platen glass, and reeled up by a reeling device.

The recording medium 203 conveyed from the recording medium conveying unit 301 is coated with the processing liquid at the processing unit 302 of FIG. 3. Due to the processing liquid having a power of aggregating ink applied to a recording medium before an image is formed thereon, it is possible to prevent bleeding, degradation of image density and coloring, and strike-through and enhance image robustness such as water resistance and weather resistance, thereby improving image quality even for image formation on a recording medium other than special paper for inkjet.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto.

Examples 1 to 18 and Comparative Examples 1 to 7

The ink sets (ink and processing liquid) shown in the following Tables were evaluated with regard to color bleed, beading, etc., as follows:

In Tables, the values in the column of the ink and the processing liquid are represented in percent by mass.

For evaluation, the processing liquid was applied to a recording medium before printing (ink application) using a wire bar (winding diameter of 0.02 mm, manufactured by Kobayashi Engineering Works, Ltd.) followed by drying in an oven at 90 degrees C. for 30 seconds and immediately thereafter the ink was applied.

In Examples 1 to 10, the sets of the single color inks of yellow, magenta, cyan, and black and the processing liquid were used and each ink was evaluated. In Examples 11 to 17, the sets of four color inks of yellow, magenta, cyan, and black and the processing liquid were used and the sets of the four color ink and the processing liquid were evaluated. In Example 18, the set of three color inks of yellow, cyan, and black and the processing liquid were used and the set of the three color ink and the processing liquid was evaluated. In Comparative Examples 1 to 7, the sets of the single color inks of yellow, magenta, cyan, and black and the processing liquid and each ink were evaluated.

In the following evaluation for the set of the four color inks and the processing liquid, a solid image was printed on the printing area separated into four equal parts to which the respective inks are applied. This is similarly applied to the set of the three color inks and the processing liquid, that is, the printing area was separated into three equal parts, where the respective inks were applied to form a solid image.

In Tables, the following was used.

PASCOL AD1: volume average particle diameter of 15 nm, urethane-based resin, glass transition temperature Tg of about 50 degrees C., manufactured by Meisei Chemical Works, Ltd.

SUPERFLEX® 150: volume average particle diameter of 100 nm, urethane-based resin, glass transition temperature Tg of about 40 degrees C., manufactured by DKS Co. Ltd.

Mowinyl 5450: volume average particle diameter of 50 nm, styrene-acrylic resin, manufactured by The Nippon Synthetic Chemical Industry Co., Ltd.

Mowinyl 6969D: volume average particle diameter of about 100 nm, styrene-acrylic resin, manufactured by The Nippon Synthetic Chemical Industry Co., Ltd.

Capstone-FS 3100: surfactant represented by Chemical formula 1, manufactured by The Chemours Company Capstone-FS34: manufactured by The Chemours Company Surfynol 465: manufactured by Shin-Etsu Chemical Co., Ltd.

Hi-Max SC-506: manufactured by Himo Corporation (cationic polymer)

Measuring

Dynamic Surface Tension

Dynamic surface tension of each ink was measured under the conditions of a temperature of 25 degrees C. and a bubble lifetime of 15 msec using a portable surface tensiometer (SITA DynoTester, manufactured by EKO Instruments Co., Ltd.).

Static Surface Tension

Static surface tension of each ink was measured at 25 degrees C. using a surface tensiometer (DY 300, manufactured by Kyowa Interface Science Co., Ltd.).

Evaluation

Color Bleed

Using a remodeled serial type printer (GXe 5500, manufactured by Ricoh Co., Ltd.), for Lumi Art Gross 130, gloss paper, clean mode, and no color calibration were selected to print a solid image, which was visually evaluated with regard to color bleed.

Figure 4:
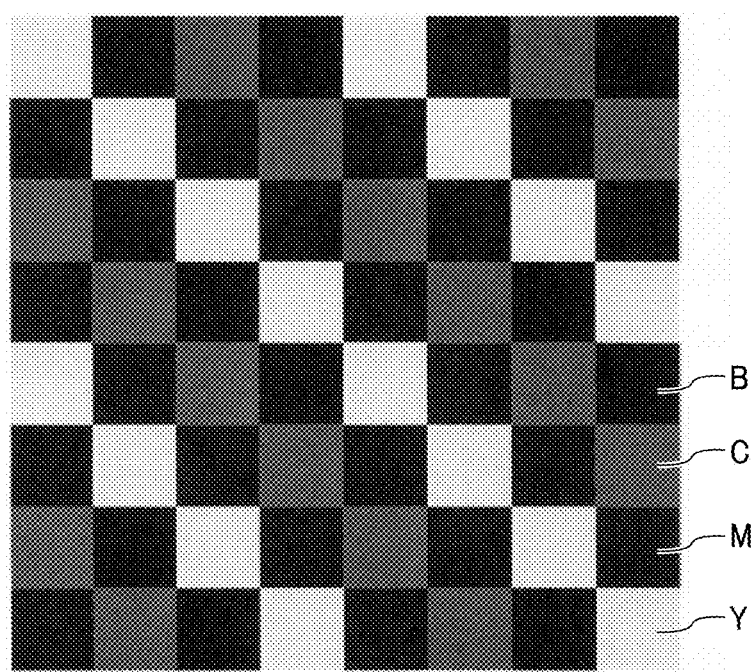
FIG. 4 is a print pattern to evaluate color bleed.

For evaluation of color bleed, the patch illustrated in FIG. 4 (Y, M, C and K respectively represent yellow, magenta, cyan, and black) was printed as a solid image and bleed at the boundary between adjacent inks of each color was evaluated. Whether the monochrome ink set or the multiple color ink set was evaluated depending on whether individual colors or the entire color is focused.

Evaluation Criteria

A: Not at all
B: Color bleed can be observed at a distance of 30 cm away
C: Color bleed can be observed at a distance of 1 m away
D: Color bleed can be observed at a distance of 1.5 m or more away Beading Using a printer (GXe 5500), for Lumi Art Gross 130, gloss paper, clean mode, and no color calibration were selected to print a solid image, which was visually evaluated with regard to density unevenness (beading).

Evaluation Criteria

AA: Not at all
A: Density unevenness can be slightly observed at a distance of 15 cm away
B: Density unevenness can be slightly observed at a distance of 30 cm away
C: Density unevenness can be observed at a distance of 1 m away
D: Density unevenness can be observed at a distance of 1.5 m or more away Storage Stability of Ink The ink was stored in a sealed container at 70 degrees C. for 14 days. The viscosity of the ink was measured before and after the storage using a viscometer (E-550 L, Cone 1°34'×R24, manufactured by TOKI SANGYO CO., LTD.). Based on the initial viscosity (viscosity before the storage) and the viscosity after the storage, storage stability was calculated from the following relation and evaluated according to the following evaluation criteria.

Storage stability=(viscosity after storage/initial viscosity)×100

Evaluation Criteria

A: 95 to 105 percent
B: 93 to less than 95 percent and over 105 to 107 percent
C: 90 to less than 93 percent and over 103 to 110 percent
D: Less than 90 percent and over 110 percent Fixability A solid image of 6 cm square was printed at 100 duty on Lumi Art Gross 130 using a printer (GXe 5500) and left alone for at least 24 hours. Thereafter, the Lumi Art Gross was attached to a crock meter (manufactured by Toyo Seiki Seisaku-Sho, Ltd.). The crock meter was reciprocated 10 times for the solid part obtained in the same manner as described above and the optical density of the contamination adhering to the thus-rubbed Lumi Art was measured by X-rite and evaluated according to the following criteria.

Evaluation Criteria

A: Transfer OD was less than 0.05
B: Transfer OD was from 0.05 to less than 0.15
C: Transfer OD was from 0.15 to less than 0.20
D: Transfer OD was 0.20 or more Blocking A solid image of 6 cm square was printed on Lumi Art Gross 130 using a printer (GXe 5500) and dried at 90 degrees C. for 30 seconds in an oven. Thereafter, the printed surfaces were overlapped facing each other, sandwiched between two 10 cm square glass plates with a load of 5 kg/cm$^2$, and left in an environment of 25 degrees C. and 50 percent humidity for 24 hours. Blocking of the printed surfaces was evaluated according to the following evaluation criteria.

Evaluation Criteria
A: No blocking
B: Slight blocking (transferred portion was slightly observed on paper)
C: Significant blocking (transferred portion was clearly observed on paper)
D: Clear blocking (adhered to each other and difficult to be detached)

Acceptance Criteria

For the obtained evaluation results, the ink sets were determined as practically usable when graded A for color bleed, B or above for beading, A for storage stability, and B or above for fixability and blocking.

In the following Tables, B* means balance.

TABLE 1

| Ink | Ink set Example 1 | | | | Ink set Example 2 | | | | Ink set Example 3 | | | |
|---|---|---|---|---|---|---|---|---|---|---|---|---|
| | 1-1 Y | 1-2 M | 1-3 C | 1-4 K | 2-1 Y | 2-2 M | 2-3 C | 2-4 K | 3-1 Y | 3-2 M | 3-3 C | 3-4 K |
| 1,3-butane diol | 23 | 23 | 23 | | 23 | 23 | 23 | | 23 | 23 | 23 | |
| 1,5-pentane diol | | | | 22.5 | | | | 22.5 | | | | 22.5 |
| Glycerin | 8 | 8 | 8 | 7.5 | 8 | 8 | 8 | 7.5 | 8 | 8 | 8 | 7.5 |
| 2-ethyl-1,3-hexanediol | 2 | 2 | 2 | 2 | 2 | 2 | 2 | 2 | 2 | 2 | 2 | 2 |
| PROXEL LV | 0.2 | 0.2 | 0.2 | 0.2 | 0.2 | 0.2 | 0.2 | 0.2 | 0.2 | 0.2 | 0.2 | 0.2 |
| 2-amino-2-ethyl-1,3-propane diol | 0.3 | 0.3 | 0.3 | 0.3 | 0.3 | 0.3 | 0.3 | 0.3 | 0.3 | 0.3 | 0.3 | 0.3 |
| 2-pyroridone | | | | 2 | | | | 2 | | | | 2 |
| PASCOL AD1 (volume average particle diameter of 15 nm, urethane-based resin) | 1 | 1 | 1 | 1 | 5 | 5 | 5 | 5 | 1 | 1 | 1 | 1 |
| Superflex 150 (volume average particle diameter of 100 nm, urethane-based resin) | | | | | | | | | | | | |
| Mowinyl 5450 (volume average particle diameter of 50 nm, styrene acrylic resin) | 5 | 5 | 5 | 5 | 5 | 5 | 5 | 5 | 10 | 10 | 10 | 10 |

TABLE 1-continued

|  | Ink set Example 1 | | | | Ink set Example 2 | | | | Ink set Example 3 | | | |
| --- | --- | --- | --- | --- | --- | --- | --- | --- | --- | --- | --- | --- |
| Ink | 1-1 Y | 1-2 M | 1-3 C | 1-4 K | 2-1 Y | 2-2 M | 2-3 C | 2-4 K | 3-1 Y | 3-2 M | 3-3 C | 3-4 K |
| Capstone FS-3100 (structure represented by Chemical formula 1) | 1 | 1 | 1 | 0.8 | 1 | 1 | 1 | 0.8 | 1 | 1 | 1 | 0.8 |
| Surfynol 465 | | | | | | | | | | | | |
| Yellow | 20 | | | | 20 | | | | 20 | | | |
| Magenta | | 20 | | | | 20 | | | | 20 | | |
| Cyan | | | 20 | | | | 20 | | | | 20 | |
| Black | | | | 20 | | | | 20 | | | | 20 |
| Highly pure water | B* | B* | B* | B* | B* | B* | B* | B* | B* | B* | B* | B* |
| Total | 100 | 100 | 100 | 100 | 100 | 100 | 100 | 100 | 100 | 100 | 100 | 100 |
| Processing liquid | | 1 | | | | 2 | | | | 3 | | |
| Magnesium sulfate (multivalent metal salt) | | 20 | | | | 40 | | | | 10 | | |
| Himax SC-506 (cationic polymer) | | | | | | | | | | | | |
| Ammonium nitrate | | | | | | | | | | | | |
| Glycerin | | 20 | | | | 30 | | | | 20 | | |
| 1,3-butane diol | | 2 | | | | 1 | | | | 3 | | |
| Octane diol | | 2 | | | | 2 | | | | 2 | | |
| LS-106 | | 0.2 | | | | 0.2 | | | | 0.2 | | |
| Capstone FS-34 | | | | | | | | | | | | |
| Highly pure water | | Balance | | | | Balance | | | | Balance | | |
| Total | | 100 | | | | 100 | | | | 100 | | |
| (A) Dynamic surface tension at 15 ms of ink (mN/m) | 35 | 36 | 35 | 37 | 34 | 35 | 36 | 36 | 33 | 34 | 33 | 36 |
| (B) Static surface tension of ink (mN/m) | 21 | 20 | 22 | 23 | 21 | 22 | 22 | 24 | 20 | 21 | 22 | 24 |
| (C) Static surface tension of processing liquid (mN/m) | | 40 | | | | 42 | | | | 38 | | |
| (D) Dynamic surface tension at 15 ms of processing liquid (mN/m) | | 52 | | | | 56 | | | | 54 | | |
| (E) Dynamic surface tension at 1500 ms of processing liquid (mN/m) | | 46 | | | | 48 | | | | 38 | | |
| (B)/(C) | 0.53 | 0.50 | 0.55 | 0.58 | 0.50 | 0.52 | 0.52 | 0.57 | 0.53 | 0.55 | 0.58 | 0.63 |
| (E)/(D) | | 0.88 | | | | 0.86 | | | | 0.70 | | |
| (A)/(B) | 1.67 | 1.80 | 1.59 | 1.61 | 1.62 | 1.59 | 1.64 | 1.50 | 1.65 | 1.62 | 1.50 | 1.50 |
| (Y)/(X) | | 2.1 | | | | 3.7 | | | | 1.7 | | |
| Color bleed | A | A | A | A | A | A | A | A | A | A | A | A |
| Beading | A | A | A | A | A | A | A | A | AA | AA | AA | AA |

TABLE 1-continued

|  | Ink set Example 1 | | | | Ink set Example 2 | | | | Ink set Example 3 | | | |
| --- | --- | --- | --- | --- | --- | --- | --- | --- | --- | --- | --- | --- |
| Ink | 1-1 Y | 1-2 M | 1-3 C | 1-4 K | 2-1 Y | 2-2 M | 2-3 C | 2-4 K | 3-1 Y | 3-2 M | 3-3 C | 3-4 K |
| Storage Stability | A | A | A | A | A | A | A | A | A | A | A | A |
| Fixability | B | B | B | B | A | A | A | A | A | A | A | A |
| Blocking | A | A | A | A | B | B | B | B | A | A | A | A |

TABLE 2

|  | Ink set Example 4 | | | | Ink set Example 5 | | | | Ink set Example 6 | | | |
| --- | --- | --- | --- | --- | --- | --- | --- | --- | --- | --- | --- | --- |
| Ink | 4-1 Y | 4-2 M | 4-3 C | 4-4 K | 5-1 Y | 5-2 M | 5-3 C | 5-4 K | 6-1 Y | 6-2 M | 6-3 C | 6-4 K |
| 1,3-butane diol | 23 | 23 | 23 |  | 23 | 23 | 23 |  | 23 | 23 | 23 |  |
| 1,5-pentane diol |  |  |  | 22.5 |  |  |  | 22.5 |  |  |  | 22.5 |
| Glycerin | 8 | 8 | 8 | 7.5 | 8 | 8 | 8 | 7.5 | 8 | 8 | 8 | 7.5 |
| 2-ethyl-1,3-hexanediol | 2 | 2 | 2 | 2 | 2 | 2 | 2 | 2 | 2 | 2 | 2 | 2 |
| PROXEL LV | 0.2 | 0.2 | 0.2 | 0.2 | 0.2 | 0.2 | 0.2 | 0.2 | 0.2 | 0.2 | 0.2 | 0.2 |
| 2-amino-2-ethyl-1,3-propane diol | 0.3 | 0.3 | 0.3 | 0.3 | 0.3 | 0.3 | 0.3 | 0.3 | 0.3 | 0.3 | 0.3 | 0.3 |
| 2-pyroridone |  |  |  | 2 |  |  |  | 2 |  |  |  | 2 |
| PASCOL AD1 (volume average particle diameter of 15 nm, urethane-based resin) | 2 | 2 | 2 | 2 | 4 | 4 | 4 | 4 | 5 | 5 | 5 | 5 |
| Superflex 150 (volume average particle diameter of 100 nm, urethane-based resin) |  |  |  |  |  |  |  |  |  |  |  |  |
| Mowinyl 5450 (volume average particle diameter of 50 nm, styrene acrylic resin) | 6 | 6 | 6 | 6 | 10 | 10 | 10 | 10 | 6 | 6 | 6 | 6 |
| Capstone FS-3100 (structure represented by Chemical formula 1) | 1 | 1 | 1 | 0.8 | 1 | 1 | 1 | 0.8 | 1 | 1 | 1 | 0.8 |
| Surfynol 465 |  |  |  |  |  |  |  |  |  |  |  |  |
| Yellow | 20 |  |  |  | 20 |  |  |  | 20 |  |  |  |
| Magenta |  | 20 |  |  |  | 20 |  |  |  | 20 |  |  |
| Cyan |  |  | 20 |  |  |  | 20 |  |  |  | 20 |  |
| Black |  |  |  | 20 |  |  |  | 20 |  |  |  | 20 |
| Highly pure water | B* | B* | B* | B* | B* | B* | B* | B* | B* | B* | B* | B* |
| Total | 100 | 100 | 100 | 100 | 100 | 100 | 100 | 100 | 100 | 100 | 100 | 100 |

TABLE 2-continued

|  | Ink set Example 4 | | | | Ink set Example 5 | | | | Ink set Example 6 | | | |
| --- | --- | --- | --- | --- | --- | --- | --- | --- | --- | --- | --- | --- |
| Ink | 4-1 Y | 4-2 M | 4-3 C | 4-4 K | 5-1 Y | 5-2 M | 5-3 C | 5-4 K | 6-1 Y | 6-2 M | 6-3 C | 6-4 K |
| Processing liquid | | 4 | | | | 5 | | | | 6 | | |
| Magnesium sulfate (multivalent metal salt) | | 20 | | | | 20 | | | | 10 | | |
| Himax SC-506 (cationic polymer) | | | | | | | | | | | | |
| Ammonium nitrate | | | | | | | | | | | | |
| Glycerin | | 20 | | | | 20 | | | | 20 | | |
| 1,3-butane diol | | 2 | | | | 2 | | | | 3 | | |
| Octane diol | | 2 | | | | 2 | | | | 2 | | |
| LS-106 | | 0.2 | | | | 0.2 | | | | 0.2 | | |
| Capstone FS-34 | | | | | | | | | | | | |
| Highly pure water | | Balance | | | | Balance | | | | Balance | | |
| Total | | 100 | | | | 100 | | | | 100 | | |
| (A) Dynamic surface tension at 15 ms of ink (mN/m) | 34 | 35 | 34 | 36 | 34 | 34 | 34 | 37 | 34 | 34 | 34 | 36 |
| (B) Static surface tension of ink (mN/m) | 21 | 21 | 21 | 23 | 21 | 20 | 20 | 24 | 20 | 21 | 20 | 24 |
| (C) Static surface tension of processing liquid (mN/m) | | 41 | | | | 40 | | | | 35 | | |
| (D) Dynamic surface tension at 15 ms of processing liquid (mN/m) | | 54 | | | | 54 | | | | 52 | | |
| (E) Dynamic surface tension at 1500 ms of processing liquid (mN/m) | | 47 | | | | 47 | | | | 35 | | |
| (B)/(C) | 0.51 | 0.51 | 0.51 | 0.56 | 0.53 | 0.50 | 0.50 | 0.60 | 0.57 | 0.60 | 0.57 | 0.69 |
| (E)/(D) | | 0.87 | | | | 0.87 | | | | 0.67 | | |
| (A)/(B) | 1.62 | 1.67 | 1.62 | 1.57 | 1.62 | 1.70 | 1.70 | 1.54 | 1.70 | 1.62 | 1.70 | 1.50 |
| (Y)/(X) | | 2.1 | | | | 2.1 | | | | 1.7 | | |
| Color bleed | A | A | A | A | A | A | A | A | A | A | A | A |
| Beading | A | A | A | A | AA | AA | AA | AA | A | A | A | A |
| Storage Stability | A | A | A | A | A | A | A | A | A | A | A | A |
| Fixability | A | A | A | A | A | A | A | A | A | A | A | A |
| Blocking | A | A | A | A | A | A | A | A | B | B | B | B |

TABLE 3

| | Ink set Example 7 | | | |
|---|---|---|---|---|
| | 7-1 | 7-2 | 7-3 | 7-4 |
| Ink | Y | M | C | K |
| 1,3-butane diol | 23 | 23 | 23 | |
| 1,5-pentane diol | | | | 22.5 |
| Glycerin | 8 | 8 | 8 | 7.5 |
| 2-ethyl-1,3-hexanediol | 2 | 2 | 2 | 2 |
| PROXEL LV | 0.2 | 0.2 | 0.2 | 0.2 |
| 2-amino-2-ethyl-1,3-propane diol | 0.3 | 0.3 | 0.3 | 0.3 |
| 2-pyroridone | | | | 2 |
| PASCOL AD1 (volume average particle diameter of 15 nm, urethane-based resin) | 1 | 1 | 1 | 1 |
| Superflex 150 (volume average particle diameter of 100 nm, urethane-based resin) | | | | |
| Mowinyl 5450 (volume average particle diameter of 50 nm, styrene acrylic resin) | 1 | 1 | 1 | 1 |
| Capstone FS-3100 (structure represented by Chemical formula 1) | 1 | 1 | 1 | 0.8 |
| Surfynol 465 | | | | |
| Yellow | 20 | | | |
| Magenta | | 20 | | |
| Cyan | | | 20 | |
| Black | | | | 20 |
| Highly pure water | Balance | Balance | Balance | Balance |
| Total | 100 | 100 | 100 | 100 |
| Processing liquid | | 7 | | |
| Magnesium sulfate (multivalent metal salt) | | 40 | | |
| Himax SC-506 (cationic polymer) | | | | |
| Ammonium nitrate | | | | |
| Glycerin | | 30 | | |
| 1,3-butane diol | | 1 | | |
| Octane diol | | 2 | | |
| LS-106 | | 0.2 | | |
| Capstone FS-34 | | | | |
| Highly pure water | | Balance | | |
| Total | | 100 | | |
| (A) Dynamic surface tension at 15 ms of ink (mN/m) | 35 | 35 | 35 | 37 |
| (B) Static surface tension of ink (mN/m) | 20 | 20 | 21 | 24 |
| (C) Static surface tension of processing liquid (mN/m) | | 40 | | |
| (D) Dynamic surface tension at 15 ms of processing liquid (mN/m) | | 55 | | |
| (E) Dynamic surface tension at 1500 ms of processing liquid (mN/m) | | 46 | | |
| (B)/(C) | 0.50 | 0.50 | 0.53 | 0.60 |
| (E)/(D) | | 0.84 | | |
| (A)/(B) | 1.75 | 1.75 | 1.67 | 1.54 |
| (Y)/(X) | | 3.7 | | |
| Color bleed | A | A | A | A |
| Beading | B | B | B | B |
| Storage Stability | A | A | A | A |
| Fixability | B | B | B | B |
| Blocking | A | A | A | A |

TABLE 4

| | Ink set Example 8 | | | | Ink set Example 9 | | | | Ink set Example 10 | | | |
|---|---|---|---|---|---|---|---|---|---|---|---|---|
| | 8-1 | 8-2 | 8-3 | 8-4 | 9-1 | 9-2 | 9-3 | 9-4 | 1-1 | 1-2 | 1-3 | 1-4 |
| Ink | Y | M | C | K | Y | M | C | K | Y | M | C | K |
| 1,3-butane diol | 23 | 23 | 23 | | 23 | 23 | 23 | | 23 | 23 | 23 | |
| 1,5-pentane diol | | | | 22.5 | | | | 22.5 | | | | 22.5 |
| Glycerin | 8 | 8 | 8 | 7.5 | 8 | 8 | 8 | 7.5 | 8 | 8 | 8 | 7.5 |
| 2-ethyl-1,3-hexanediol | 2 | 2 | 2 | 2 | 2 | 2 | 2 | 2 | 2 | 2 | 2 | 2 |
| PROXEL LV | 0.2 | 0.2 | 0.2 | 0.2 | 0.2 | 0.2 | 0.2 | 0.2 | 0.2 | 0.2 | 0.2 | 0.2 |
| 2-amino-2-ethyl-1,3-propane diol | 0.3 | 0.3 | 0.3 | 0.3 | 0.3 | 0.3 | 0.3 | 0.3 | 0.3 | 0.3 | 0.3 | 0.3 |
| 2-pyroridone | | | | 2 | | | | 2 | | | | 2 |
| PASCOL AD1 (volume average particle diameter of 15 nm, urethane-based resin) | | | | | 1 | 1 | 1 | 1 | 1 | 1 | 1 | 1 |
| Superflex 150 (volume average | 1 | 1 | 1 | 1 | | | | | | | | |

TABLE 4-continued

|  | Ink set Example 8 | | | | Ink set Example 9 | | | | Ink set Example 10 | | | |
| --- | --- | --- | --- | --- | --- | --- | --- | --- | --- | --- | --- | --- |
| Ink | 8-1 Y | 8-2 M | 8-3 C | 8-4 K | 9-1 Y | 9-2 M | 9-3 C | 9-4 K | 1-1 Y | 1-2 M | 1-3 C | 1-4 K |
| particle diameter of 100 nm, urethane-based resin) | | | | | | | | | | | | |
| Mowinyl 5450 (volume average particle diameter of 50 nm, styrene acrylic resin) | 5 | 5 | 5 | 5 | | | | | 5 | 5 | 5 | 5 |
| Capstone FS-3100 (structure represented by Chemical formula 1) | | | | | 5 | 5 | 5 | 5 | | | | |
| Surfynol 465 | 1 | 1 | 1 | 0.8 | 1 | 1 | 1 | 0.8 | 1 | 1 | 1 | 0.8 |
| Yellow | 20 | | | | 20 | | | | 20 | | | |
| Magenta | | 20 | | | | 20 | | | | 20 | | |
| Cyan | | | 20 | | | | 20 | | | | 20 | |
| Black | | | | 20 | | | | 20 | | | | 20 |
| Highly pure water | B* | B* | B* | B* | B* | B* | B* | B* | B* | B* | B* | B* |
| Total | 100 | 100 | 100 | 100 | 100 | 100 | 100 | 100 | 100 | 100 | 100 | 100 |
| Processing liquid | | 1 | | | | 1 | | | | 8 | | |
| Magnesium sulfate (multivalent metal salt) | | 20 | | | | 20 | | | | | | |
| Himax SC-506 (cationic polymer) | | | | | | | | | | 20 | | |
| Ammonium nitrate | | | | | | | | | | | | |
| Glycerin | | | | | | | | | | | | |
| 1,3-butane diol | | 20 | | | | 20 | | | | 20 | | |
| Octane diol | | 2 | | | | 2 | | | | 2 | | |
| LS-106 | | 2 | | | | 2 | | | | 2 | | |
| Capstone FS-34 | | 0.2 | | | | 0.2 | | | | 0.2 | | |
| Highly pure water | | Balance | | | | Balance | | | | Balance | | |
| Total | | 100 | | | | 100 | | | | 100 | | |
| (A) Dynamic surface tension at 15 ms of ink (mN/m) | 34 | 33 | 35 | 36 | 32 | 33 | 33 | 35 | 35 | 36 | 35 | 37 |
| (B) Static surface tension of ink (mN/m) | 20 | 20 | 21 | 22 | 20 | 20 | 21 | 23 | 21 | 20 | 22 | 23 |
| (C) Static surface tension of processing liquid (mN/m) | | 40 | | | | 40 | | | | 41 | | |
| (D) Dynamic surface | | 52 | | | | 52 | | | | 51 | | |

TABLE 4-continued

|  | Ink set Example 8 | | | | Ink set Example 9 | | | | Ink set Example 10 | | | |
|---|---|---|---|---|---|---|---|---|---|---|---|---|
| Ink | 8-1 Y | 8-2 M | 8-3 C | 8-4 K | 9-1 Y | 9-2 M | 9-3 C | 9-4 K | 1-1 Y | 1-2 M | 1-3 C | 1-4 K |
| tension at 15 ms of processing liquid (mN/m) (E) | | 46 | | | | 46 | | | | 45 | | |
| Dynamic surface tension at 1500 ms of processing liquid (mN/m) | | | | | | | | | | | | |
| (B)/(C) | 0.50 | 0.50 | 0.53 | 0.55 | 0.50 | 0.50 | 0.53 | 0.58 | 0.51 | 0.49 | 0.54 | 0.56 |
| (E)/(D) | | 0.88 | | | | 0.88 | | | | 0.88 | | |
| (A)/(B) | 1.70 | 1.65 | 1.67 | 1.64 | 1.60 | 1.65 | 1.57 | 1.52 | 1.67 | 1.80 | 1.59 | 1.61 |
| (Y)/(X) | | 2.2 | | | | 2.5 | | | | 2.0 | | |
| Color bleed | B | B | B | B | B | B | B | B | A | A | A | A |
| Beading | B | B | B | B | B | B | B | B | A | A | A | A |
| Storage Stability | B | B | B | B | A | A | A | A | A | A | A | A |
| Fixability | A | A | A | A | B | B | B | B | B | B | B | B |
| Blocking | B | B | B | B | B | B | B | B | A | A | A | A |

TABLE 5

|  | Ink set Example 11 | | | | Ink set Example 11 | | | | Ink set Example 11 | | | |
|---|---|---|---|---|---|---|---|---|---|---|---|---|
| Ink | 1-1 Y | 1-2 M | 1-3 C | 1-4 K | 2-1 Y | 2-2 M | 2-3 C | 2-4 K | 3-1 Y | 3-2 M | 3-3 C | 3-4 K |
| 1,3-butane diol | 23 | 23 | 23 | | 23 | 23 | 23 | | 23 | 23 | 23 | |
| 1,5-pentane diol | | | | 22.5 | | | | 22.5 | | | | 22.5 |
| Glycerin | 8 | 8 | 8 | 7.5 | 8 | 8 | 8 | 7.5 | 8 | 8 | 8 | 7.5 |
| 2-ethyl-1,3-hexanediol | 2 | 2 | 2 | 2 | 2 | 2 | 2 | 2 | 2 | 2 | 2 | 2 |
| PROXEL LV | 0.2 | 0.2 | 0.2 | 0.2 | 0.2 | 0.2 | 0.2 | 0.2 | 0.2 | 0.2 | 0.2 | 0.2 |
| 2-amino-2-ethyl-1,3-propane diol | 0.3 | 0.3 | 0.3 | 0.3 | 0.3 | 0.3 | 0.3 | 0.3 | 0.3 | 0.3 | 0.3 | 0.3 |
| 2-pyroridone | | | | 2 | | | | 2 | | | | 2 |
| PASCOL AD1 (volume average particle diameter of 15 nm, urethane-based resin) | 1 | 1 | 1 | 1 | 5 | 5 | 5 | 5 | 1 | 1 | 1 | 1 |
| Superflex 150 (volume average particle diameter of 100 nm, urethane-based resin) | | | | | | | | | | | | |
| Mowinyl 5450 (volume average particle diameter of 50 nm, styrene acrylic resin) | 5 | 5 | 5 | 5 | 5 | 5 | 5 | 5 | 10 | 10 | 10 | 10 |

TABLE 5-continued

| | Ink set Example 11 | | | | Ink set Example 11 | | | | Ink set Example 11 | | | |
|---|---|---|---|---|---|---|---|---|---|---|---|---|
| Ink | 1-1 Y | 1-2 M | 1-3 C | 1-4 K | 2-1 Y | 2-2 M | 2-3 C | 2-4 K | 3-1 Y | 3-2 M | 3-3 C | 3-4 K |
| Capstone FS-3100 (structure represented by Chemical formula 1) | 1 | 1 | 1 | 0.8 | 1 | 1 | 1 | 0.8 | 1 | 1 | 1 | 0.8 |
| Surfynol 465 | | | | | | | | | | | | |
| Yellow | 20 | | | | 20 | | | | 20 | | | |
| Magenta | | 20 | | | | 20 | | | | 20 | | |
| Cyan | | | 20 | | | | 20 | | | | 20 | |
| Black | | | | 20 | | | | 20 | | | | 20 |
| Highly pure water | B* | B* | B* | B* | B* | B* | B* | B* | B* | B* | B* | B* |
| Total | 100 | 100 | 100 | 100 | 100 | 100 | 100 | 100 | 100 | 100 | 100 | 100 |
| Processing liquid | | 1 | | | | 2 | | | | 3 | | |
| Magnesium sulfate (multivalent metal salt) | | 20 | | | | 40 | | | | 10 | | |
| Himax SC-506 (cationic polymer) | | | | | | | | | | | | |
| Ammonium nitrate | | | | | | | | | | | | |
| Glycerin | | 20 | | | | 30 | | | | 20 | | |
| 1,3-butane diol | | 2 | | | | 1 | | | | 3 | | |
| Octane diol | | 2 | | | | 2 | | | | 2 | | |
| LS-106 | | 0.2 | | | | 0.2 | | | | 0.2 | | |
| Capstone FS-34 | | | | | | | | | | | | |
| Highly pure water | | Balance | | | | Balance | | | | Balance | | |
| Total | | 100 | | | | 100 | | | | 100 | | |
| (A) Dynamic surface tension at 15 ms of ink (mN/m) | 35 | 36 | 35 | 37 | 34 | 35 | 36 | 36 | 33 | 34 | 33 | 36 |
| (B) Static surface tension of ink (mN/m) | 21 | 20 | 22 | 23 | 21 | 22 | 22 | 24 | 20 | 21 | 22 | 24 |
| (C) Static surface tension of processing liquid (mN/m) | | 40 | | | | 42 | | | | 38 | | |
| (D) Dynamic surface tension at 15 ms of processing liquid (mN/m) | | 52 | | | | 56 | | | | 54 | | |
| (E) Dynamic surface tension at 1500 ms of processing liquid (mN/m) | | 46 | | | | 48 | | | | 38 | | |
| (B)/(C) | 0.53 | 0.50 | 0.55 | 0.58 | 0.50 | 0.52 | 0.52 | 0.57 | 0.53 | 0.55 | 0.58 | 0.63 |
| (E)/(D) | | 0.88 | | | | 0.86 | | | | 0.70 | | |
| (A)/(B) | 1.67 | 1.80 | 1.59 | 1.61 | 1.62 | 1.59 | 1.64 | 1.50 | 1.65 | 1.62 | 1.50 | 1.50 |
| (Y)/(X) | | 2.1 | | | | 3.7 | | | | 1.7 | | |
| Color bleed | | A | | | | A | | | | A | | |
| Beading | | A | | | | A | | | | AA | | |

TABLE 5-continued

|  | Ink set Example 11 | | | | Ink set Example 11 | | | | Ink set Example 11 | | | |
|---|---|---|---|---|---|---|---|---|---|---|---|---|
| Ink | 1-1 Y | 1-2 M | 1-3 C | 1-4 K | 2-1 Y | 2-2 M | 2-3 C | 2-4 K | 3-1 Y | 3-2 M | 3-3 C | 3-4 K |
| Storage Stability | | A | | | | A | | | | A | | |
| Fixability | | B | | | | A | | | | A | | |
| Blocking | | A | | | | B | | | | A | | |

TABLE 6

|  | Ink set Example 14 | | | | Ink set Example 15 | | | | Ink set Example 16 | | | |
|---|---|---|---|---|---|---|---|---|---|---|---|---|
| Ink | 4-1 Y | 4-2 M | 4-3 C | 4-4 K | 5-1 Y | 5-2 M | 5-3 C | 5-4 K | 6-1 Y | 6-2 M | 6-3 C | 6-4 K |
| 1,3-butane diol | 23 | 23 | 23 | | 23 | 23 | 23 | | 23 | 23 | 23 | |
| 1,5-pentane diol | | | | 22.5 | | | | 22.5 | | | | 22.5 |
| Glycerin | 8 | 8 | 8 | 7.5 | 8 | 8 | 8 | 7.5 | 8 | 8 | 8 | 7.5 |
| 2-ethyl-1,3-hexanediol | 2 | 2 | 2 | 2 | 2 | 2 | 2 | 2 | 2 | 2 | 2 | 2 |
| PROXEL LV | 0.2 | 0.2 | 0.2 | 0.2 | 0.2 | 0.2 | 0.2 | 0.2 | 0.2 | 0.2 | 0.2 | 0.2 |
| 2-amino-2-ethyl-1,3-propane diol | 0.3 | 0.3 | 0.3 | 0.3 | 0.3 | 0.3 | 0.3 | 0.3 | 0.3 | 0.3 | 0.3 | 0.3 |
| 2-pyroridone | | | | 2 | | | | 2 | | | | 2 |
| PASCOL AD1 (volume average particle diameter of 15 nm, urethane-based resin) | 2 | 2 | 2 | 2 | 4 | 4 | 4 | 4 | 5 | 5 | 5 | 5 |
| Superflex 150 (volume average particle diameter of 100 nm, urethane-based resin) | | | | | | | | | | | | |
| Mowinyl 5450 (volume average particle diameter of 50 nm, styrene acrylic resin) | 6 | 6 | 6 | 6 | 10 | 10 | 10 | 10 | 6 | 6 | 6 | 6 |
| Capstone FS-3100 (structure represented by Chemical formula 1) | 1 | 1 | 1 | 0.8 | 1 | 1 | 1 | 0.8 | 1 | 1 | 1 | 0.8 |
| Surfynol 465 | | | | | | | | | | | | |
| Yellow | 20 | | | | 20 | | | | 20 | | | |
| Magenta | | 20 | | | | 20 | | | | 20 | | |
| Cyan | | | 20 | | | | 20 | | | | 20 | |
| Black | | | | 20 | | | | 20 | | | | 20 |
| Highly pure water | B* | B* | B* | B* | B* | B* | B* | B* | B* | B* | B* | B* |
| Total | 100 | 100 | 100 | 100 | 100 | 100 | 100 | 100 | 100 | 100 | 100 | 100 |

TABLE 6-continued

| Ink | Ink set Example 14 | | | | Ink set Example 15 | | | | Ink set Example 16 | | | |
|---|---|---|---|---|---|---|---|---|---|---|---|---|
| | 4-1 Y | 4-2 M | 4-3 C | 4-4 K | 5-1 Y | 5-2 M | 5-3 C | 5-4 K | 6-1 Y | 6-2 M | 6-3 C | 6-4 K |
| Processing liquid | | 4 | | | | 5 | | | | 6 | | |
| Magnesium sulfate (multivalent metal salt) | | 20 | | | | 20 | | | | 10 | | |
| Himax SC-506 (cationic polymer) | | | | | | | | | | | | |
| Ammonium nitrate | | | | | | | | | | | | |
| Glycerin | | 20 | | | | 20 | | | | 20 | | |
| 1,3-butane diol | | 2 | | | | 2 | | | | 3 | | |
| Octane diol | | 2 | | | | 2 | | | | 2 | | |
| LS-106 | | 0.2 | | | | 0.2 | | | | 0.2 | | |
| Capstone FS-34 | | | | | | | | | | | | |
| Highly pure water | | Balance | | | | Balance | | | | Balance | | |
| Total | | 100 | | | | 100 | | | | 100 | | |
| (A) Dynamic surface tension at 15 ms of ink (mN/m) | 34 | 35 | 34 | 36 | 34 | 34 | 34 | 37 | 34 | 34 | 34 | 36 |
| (B) Static surface tension of ink (mN/m) | 21 | 21 | 21 | 23 | 21 | 20 | 20 | 24 | 20 | 21 | 20 | 24 |
| (C) Static surface tension of processing liquid (mN/m) | | 41 | | | | 40 | | | | 35 | | |
| (D) Dynamic surface tension at 15 ms of processing liquid (mN/m) | | 54 | | | | 54 | | | | 52 | | |
| (E) Dynamic surface tension at 1500 ms of processing liquid (mN/m) | | 47 | | | | 47 | | | | 35 | | |
| (B)/(C) | 0.51 | 0.51 | 0.51 | 0.56 | 0.53 | 0.50 | 0.50 | 0.60 | 0.57 | 0.60 | 0.57 | 0.69 |
| (E)/(D) | | 0.87 | | | | 0.87 | | | | 0.67 | | |
| (A)/(B) | 1.62 | 1.67 | 1.62 | 1.57 | 1.62 | 1.70 | 1.70 | 1.54 | 1.70 | 1.62 | 1.70 | 1.50 |
| (Y)/(X) | | | 2.1 | | | | 2.1 | | | | 1.7 | |
| Color bleed | | A | | | | A | | | | A | | |
| Beading | | A | | | | AA | | | | A | | |
| Storage Stability | | A | | | | A | | | | A | | |
| Fixability | | A | | | | A | | | | A | | |
| Blocking | | A | | | | A | | | | B | | |

TABLE 7

| Ink | Ink set Example 17 | | | | Ink set Example 18 | | |
|---|---|---|---|---|---|---|---|
| | 7-1 Y | 7-2 M | 7-3 C | 7-4 K | 1-1 Y | 1-3 C | 1-4 K |
| 1,3-butane diol | 23 | 23 | 23 | | 23 | 23 | |
| 1,5-pentane diol | | | | 22.5 | | | 22.5 |

TABLE 7-continued

|  | Ink set Example 17 | | | | Ink set Example 18 | | |
| --- | --- | --- | --- | --- | --- | --- | --- |
|  | 7-1 | 7-2 | 7-3 | 7-4 | 1-1 | 1-3 | 1-4 |
| Ink | Y | M | C | K | Y | C | K |
| Glycerin | 8 | 8 | 8 | 7.5 | 8 | 8 | 7.5 |
| 2-ethyl-1,3-hexanediol | 2 | 2 | 2 | 2 | 2 | 2 | 2 |
| PROXEL LV | 0.2 | 0.2 | 0.2 | 0.2 | 0.2 | 0.2 | 0.2 |
| 2-amino-2-ethyl-1,3-propane diol | 0.3 | 0.3 | 0.3 | 0.3 | 0.3 | 0.3 | 0.3 |
| 2-pyroridane |  |  |  | 2 |  |  | 2 |
| PASCOL AD1 (volume average particle diameter of 15 nm, urethane-based resin) | 1 | 1 | 1 | 1 | 1 | 1 | 1 |
| Superflex 150 (volume average particle diameter of 100 nm, urethane-based resin) |  |  |  |  |  |  |  |
| Mowinyl 5450 (volume average particle diameter of 50 nm, styrene acrylic resin) | 1 | 1 | 1 | 1 | 5 | 5 | 5 |
| Capstone FS-3100 (structure represented by Chemical formula 1) | 1 | 1 | 1 | 0.8 | 1 | 1 | 0.8 |
| Surfynol 465 |  |  |  |  |  |  |  |
| Yellow | 20 |  |  |  | 20 |  |  |
| Magenta |  | 20 |  |  |  |  |  |
| Cyan |  |  | 20 |  |  | 20 |  |
| Black |  |  |  | 20 |  |  | 20 |
| Highly pure water | Balance | Balance | Balance | Balance | Balance | Balance | Balance |
| Total | 100 | 100 | 100 | 100 | 100 | 100 | 100 |
| Processing liquid |  | 7 | | |  | 1 | |
| Magnesium sulfate (multivalent metal salt) |  | 40 | | |  | 20 | |
| Himax SC-506 (cationic polymer) |  | | | |  | | |
| Ammonium nitrate |  | | | |  | | |
| Glycerin |  | 30 | | |  | 20 | |
| 1,3-butane diol |  | 1 | | |  | 2 | |
| Octane diol |  | 2 | | |  | 2 | |
| LS-106 |  | 0.2 | | |  | 0.2 | |
| Capstone FS-34 |  | | | |  | | |
| Highly pure water |  | Balance | | |  | Balance | |
| Total |  | 100 | | |  | 100 | |
| (A) Dynamic surface tension at 15 ms of ink (mN/m) | 35 | 35 | 35 | 37 | 35 | 35 | 37 |
| (B) Static surface tension of ink (mN/m) | 20 | 20 | 21 | 24 | 21 | 22 | 23 |
| (C) Static surface tension of processing liquid (mN/m) |  | 40 | | |  | 40 | |
| (D) Dynamic surface tension at 15 ms of processing liquid (mN/m) |  | 55 | | |  | 52 | |
| (E) Dynamic surface tension at 1500 ms of processing liquid (mN/m) |  | 46 | | |  | 46 | |
| (B)/(C) | 0.50 | 0.50 | 0.53 | 0.60 | 0.53 | 0.55 | 0.58 |
| (E)/(D) |  | 0.84 | | |  | 0.88 | |
| (A)/(B) | 1.75 | 1.75 | 1.67 | 1.54 | 1.67 | 1.59 | 1.61 |
| (Y)/(X) |  | 3.7 | | |  | 2.1 | |
| Color bleed |  | A | | |  | A | |
| Beading |  | B | | |  | A | |

TABLE 7-continued

|  | Ink set Example 17 | | | | Ink set Example 18 | | |
|---|---|---|---|---|---|---|---|
| Ink | 7-1 Y | 7-2 M | 7-3 C | 7-4 K | 1-1 Y | 1-3 C | 1-4 K |
| Storage Stability | | A | | | | A | |
| Fixability | | B | | | | B | |
| Blocking | | A | | | | A | |

TABLE 8

|  | Ink set Comparative Example 1 | | | | Ink set Comparative Example 2 | | | | Ink set Comparative Example 3 | | | |
|---|---|---|---|---|---|---|---|---|---|---|---|---|
| Ink | 10-1 Y | 10-2 M | 10-3 C | 10-4 K | 11-1 Y | 11-2 M | 11-3 C | 11-4 K | 12-1 Y | 12-2 M | 12-3 C | 12-4 K |
| 1,3-butane diol | 23 | 23 | 23 | | 23 | 23 | 23 | | 23 | 23 | 23 | |
| 1,5-pentane diol | | | | 22.5 | | | | 22.5 | | | | 22.5 |
| Glycerin | 8 | 8 | 8 | 7.5 | 8 | 8 | 8 | 7.5 | 8 | 8 | 8 | 7.5 |
| 2-ethyl-1,3-hexanediol | 2 | 2 | 2 | 2 | 2 | 2 | 2 | 2 | 2 | 2 | 2 | 2 |
| PROXEL LV | 0.2 | 0.2 | 0.2 | 0.2 | 0.2 | 0.2 | 0.2 | 0.2 | 0.2 | 0.2 | 0.2 | 0.2 |
| 2-amino-2-ethyl-1,3-propane diol | 0.3 | 0.3 | 0.3 | 0.3 | 0.3 | 0.3 | 0.3 | 0.3 | 0.3 | 0.3 | 0.3 | 0.3 |
| 2-pyroridone | | | | 2 | | | | 2 | | | | 2 |
| PASCOL AD1 (volume average particle diameter of 15 nm, urethane-based resin) | | | | | 1 | 1 | 1 | 1 | | | | |
| Superflex 150 (volume average particle diameter of 100 nm, urethane-based resin) | 5 | 5 | 5 | 5 | | | | | 1 | 1 | 1 | 1 |
| Mowinyl 5450 (volume average particle diameter of 50 nm, styrene acrylic resin) | | | | | | | | | 10 | 10 | 10 | 10 |
| Capstone FS-3100 (structure represented by Chemical formula 1) | 1 | 1 | 1 | 0.8 | 1 | 1 | 1 | 0.8 | 1 | 1 | 1 | 0.8 |
| Surfynol 465 | | | | | | | | | | | | |
| Yellow | 20 | | | | 20 | | | | 20 | | | |
| Magenta | | 20 | | | | 20 | | | | 20 | | |
| Cyan | | | 20 | | | | 20 | | | | 20 | |
| Black | | | | 20 | | | | 20 | | | | 20 |
| Highly pure water | B* | B* | B* | B* | B* | B* | B* | B* | B* | B* | B* | B* |
| Total | 100 | 100 | 100 | 100 | 100 | 100 | 100 | 100 | 100 | 100 | 100 | 100 |

TABLE 8-continued

| | Ink set Comparative Example 1 | | | | Ink set Comparative Example 2 | | | | Ink set Comparative Example 3 | | | |
|---|---|---|---|---|---|---|---|---|---|---|---|---|
| Ink | 10-1 Y | 10-2 M | 10-3 C | 10-4 K | 11-1 Y | 11-2 M | 11-3 C | 11-4 K | 12-1 Y | 12-2 M | 12-3 C | 12-4 K |
| Processing liquid | | 9 | | | | 10 | | | | 11 | | |
| Magnesium sulfate (multivalent metal salt) | | 20 | | | | | | | | | | |
| Himax SC-506 (cationic polymer) | | | | | | 50 | | | | | | |
| Ammonium nitrate | | | | | | | | | | 15 | | |
| Glycerin | | 20 | | | | | | | | 20 | | |
| 1,3-butane diol | | 2 | | | | 15 | | | | 3 | | |
| Octane dial | | 2 | | | | 2 | | | | 2 | | |
| LS-106 | | 0.2 | | | | 0.2 | | | | 0.2 | | |
| Capstone FS-34 | | | | | | | | | | | | |
| Highly pure water | | Balance | | | | Balance | | | | Balance | | |
| Total | | 100 | | | | 100 | | | | 100 | | |
| (A) Dynamic surface tension at 15 ms of ink (mN/m) | 34 | 35 | 35 | 37 | 34 | 34 | 33 | 37 | 35 | 36 | 35 | 38 |
| (B) Static surface tension of ink (mN/m) | 21 | 22 | 21 | 23 | 20 | 21 | 20 | 23 | 20 | 20 | 20 | 19 |
| (C) Static surface tension of processing liquid (mN/m) | | 40 | | | | 32 | | | | 41 | | |
| (D) Dynamic surface tension at 15 ms of processing liquid (mN/m) | | 52 | | | | 57 | | | | 52 | | |
| (E) Dynamic surface tension at 1500 ms of processing liquid (mN/m) | | 46 | | | | 48 | | | | 47 | | |
| (B)/(C) | 0.53 | 0.55 | 0.53 | 0.58 | 0.63 | 0.66 | 0.63 | 0.72 | 0.49 | 0.49 | 0.49 | 0.46 |
| (E)/(D) | | 0.88 | | | | 0.84 | | | | 0.90 | | |
| (A)/(B) | 1.62 | 1.59 | 1.67 | 1.61 | 1.70 | 1.62 | 1.65 | 1.61 | 1.75 | 1.80 | 1.75 | 2.00 |
| (Y)/(X) | | 2.1 | | | | 4.3 | | | | 2.2 | | |
| Color bleed | A | A | A | A | A | A | A | A | C | C | C | C |
| Beading | B | B | B | B | B | B | B | B | B | B | B | B |
| Storage Stability | A | A | A | A | A | A | A | A | A | A | A | A |
| Fixability | A | A | A | A | D | D | D | D | A | A | A | A |
| Blocking | D | D | D | D | C | C | C | C | A | A | A | A |

TABLE 9

| Ink | Ink set Comparative Example 4 | | | | Ink set Comparative Example 5 | | | | Ink set Comparative Example 6 | | | |
| --- | --- | --- | --- | --- | --- | --- | --- | --- | --- | --- | --- | --- |
| | 13-1 Y | 13-2 M | 13-3 C | 13-4 K | 14-1 Y | 14-2 M | 14-3 C | 14-4 K | 15-1 Y | 15-2 M | 15-3 C | 15-4 K |
| 1,3-butane diol | 23 | 23 | 23 | | 23 | 23 | 23 | | 23 | 23 | 23 | |
| 1,5-pentane diol | | | | 22.5 | | | | 22.5 | | | | 22.5 |
| Glycerin | 8 | 8 | 8 | 7.5 | 8 | 8 | 8 | 7.5 | 8 | 8 | 8 | 7.5 |
| 2-ethyl-1,3-hexanediol | 2 | 2 | 2 | 2 | 2 | 2 | 2 | 2 | 2 | 2 | 2 | 2 |
| PROXEL LV | 0.2 | 0.2 | 0.2 | 0.2 | 0.2 | 0.2 | 0.2 | 0.2 | 0.2 | 0.2 | 0.2 | 0.2 |
| 2-amino-2-ethyl-1,3-propane diol | 0.3 | 0.3 | 0.3 | 0.3 | 0.3 | 0.3 | 0.3 | 0.3 | 0.3 | 0.3 | 0.3 | 0.3 |
| 2-pyroridone | | | | 2 | | | | 2 | | | | 2 |
| PASCOL AD1 (volume average particle diameter of 15 nm, urethane-based resin) | 5 | 5 | 5 | 5 | | | | | 5 | 5 | 5 | 5 |
| Superflex 150 (volume average particle diameter of 100 nm, urethane-based resin) | | | | | | | | | | | | |
| Mowinyl 5450 (volume average particle diameter of 50 nm, styrene acrylic resin) | | | | | 10 | 10 | 10 | 10 | 15 | 15 | 15 | 15 |
| Capstone FS-3100 (structure represented by Chemical formula 1) | | | | | 1 | 1 | 1 | 0.8 | 1 | 1 | 1 | 0.8 |
| Surfynol 465 | 0.8 | 0.8 | 0.8 | 0.6 | | | | | | | | |
| Yellow | 20 | | | | 20 | | | | 20 | | | |
| Magenta | | 20 | | | | 20 | | | | 20 | | |
| Cyan | | | 20 | | | | 20 | | | | 20 | |
| Black | | | | 20 | | | | 20 | | | | 20 |
| Highly pure water | B* | B* | B* | B* | B* | B* | B* | B* | B* | B* | B* | B* |
| Total | 100 | 100 | 100 | 100 | 100 | 100 | 100 | 100 | 100 | 100 | 100 | 100 |
| Processing liquid | | 12 | | | | 13 | | | | 14 | | |
| Magnesium sulfate (multivalent metal salt) | | | | | | 20 | | | | 40 | | |
| Himax SC-506 (cationic polymer) | | 50 | | | | | | | | | | |
| Ammonium nitrate | | | | | | | | | | | | |
| Glycerin | | | | | | 20 | | | | 30 | | |

TABLE 9-continued

|  | Ink set Comparative Example 4 | | | | Ink set Comparative Example 5 | | | | Ink set Comparative Example 6 | | | |
|---|---|---|---|---|---|---|---|---|---|---|---|---|
| Ink | 13-1 Y | 13-2 M | 13-3 C | 13-4 K | 14-1 Y | 14-2 M | 14-3 C | 14-4 K | 15-1 Y | 15-2 M | 15-3 C | 15-4 K |
| 1,3-butane diol | | 15 | | | | 2 | | | | 1 | | |
| Octane diol | | 2 | | | | 2 | | | | 2 | | |
| LS-106 | | | | | | 0.2 | | | | 0.2 | | |
| Capstone FS-34 | | 0.5 | | | | | | | | | | |
| Highly pure water | | Balance | | | | Balance | | | | Balance | | |
| Total | | 100 | | | | 100 | | | | 100 | | |
| (A) Dynamic surface tension at 15 ms of ink (mN/m) | 32 | 33 | 32 | 34 | 34 | 34 | 33 | 36 | 34 | 33 | 33 | 37 |
| (B) Static surface tension of ink (mN/m) | 25 | 26 | 25 | 26 | 21 | 20 | 21 | 23 | 20 | 20 | 20 | 19 |
| (C) Static surface tension of processing liquid (mN/m) | | 21 | | | | 40 | | | | 41 | | |
| (D) Dynamic surface tension at 15 ms of processing liquid (mN/m) | | 40 | | | | 52 | | | | 52 | | |
| (E) Dynamic surface tension at 1500 ms of processing liquid (mN/m) | | 24 | | | | 46 | | | | 47 | | |
| (B)/(C) | 1.19 | 1.24 | 1.19 | 1.24 | 0.53 | 0.50 | 0.53 | 0.58 | 0.49 | 0.49 | 0.49 | 0.46 |
| (E)/(D) | | 0.60 | | | | 0.88 | | | | 0.90 | | |
| (A)/(B) | 1.28 | 1.27 | 1.28 | 1.31 | 1.62 | 1.70 | 1.57 | 1.57 | 1.70 | 1.65 | 1.65 | 1.95 |
| (Y)/(X) | | 4.2 | | | | 2.1 | | | | 2.1 | | |
| Color bleed | A | A | A | A | A | A | A | A | A | A | A | A |
| Beading | B | B | B | B | A | A | A | A | C | C | C | C |
| Storage Stability | A | A | A | A | A | A | A | A | A | A | A | A |
| Fixability | C | C | C | C | D | D | D | D | B | B | B | B |
| Blocking | D | D | D | D | A | A | A | A | C | C | C | C |

TABLE 10

|  | Ink set Comparative Example 7 | | | |
|---|---|---|---|---|
|  | 16-1 | 16-2 | 16-3 | 16-4 |
|  | Ink | | | |
|  | Y | M | C | K |
| 1,3-butane diol | 23 | 23 | 23 | |
| 1,5-pentane diol | | | | 22.5 |
| Glycerin | 8 | 8 | 8 | 7.5 |
| 2-ethyl-1,3-hexanediol | 2 | 2 | 2 | 2 |
| PROXEL LV | 0.2 | 0.2 | 0.2 | 0.2 |
| 2-amino-2-ethyl-1,3-propane diol | 0.3 | 0.3 | 0.3 | 0.3 |
| 2-pyroridone | | | | 2 |
| PASCOLAD1 (volume average particle diameter of 15 nm, urethane-based resin) | 2 | 2 | 2 | 2 |
| Superflex 150 (volume average particle diameter of 100 nm, urethane-based resin) | 2 | 2 | 2 | 2 |
| Mowinyl 5450 (volume average particle diameter of 50 nm, styrene acrylic resin) | 5 | 5 | 5 | 5 |
| Capstone FS-3100 (structure represented by Chemical formula 1) | 1 | 1 | 1 | 0.8 |
| Surfynol 465 | | | | |
| Yellow | 20 | | | |
| Magenta | | 20 | | |

TABLE 10-continued

| | Ink set Comparative Example 7 | | | |
|---|---|---|---|---|
| | 16-1 | 16-2 | 16-3 | 16-4 |
| | \multicolumn{4}{c}{Ink} | | | |
| | Y | M | C | K |
| Cyan | | | 20 | |
| Black | | | | 20 |
| Highly pure water | Balance | Balance | Balance | Balance |
| Total | 100 | 100 | 100 | 100 |
| Processing liquid | \multicolumn{4}{c}{15} | | | |
| Magnesium sulfate (multivalent metal salt) | \multicolumn{4}{c}{40} | | | |
| Himax SC-506 (cationic polymer) | | | | |
| Ammonium nitrate | | | | |
| Glycerin | \multicolumn{4}{c}{30} | | | |
| 1,3-butane diol | \multicolumn{4}{c}{1} | | | |
| Octane diol | \multicolumn{4}{c}{2} | | | |
| LS-106 | | | | |
| Capstone FS-34 | \multicolumn{4}{c}{0.2} | | | |
| Highly pure water | \multicolumn{4}{c}{Balance} | | | |
| Total | \multicolumn{4}{c}{100} | | | |
| (A) Dynamic surface tension at 15 ms of ink (mN/m) | 33 | 33 | 34 | 36 |
| (B) Static surface tension of ink (mN/m) | 20 | 20 | 21 | 23 |
| (C) Static surface tension of processing liquid (mN/m) | \multicolumn{4}{c}{41} | | | |
| (D) Dynamic surface tension at 15 ms of processing liquid (mN/m) | \multicolumn{4}{c}{52} | | | |
| (E) Dynamic surface tension at 1500 ms of processing liquid (mN/m) | \multicolumn{4}{c}{48} | | | |
| (B)/(C) | 0.49 | 0.49 | 0.51 | 0.56 |
| (E)/(D) | \multicolumn{4}{c}{0.92} | | | |
| (A)/(B) | 1.65 | 1.65 | 1.62 | 1.57 |
| (Y)/(X) | \multicolumn{4}{c}{2.1} | | | |
| Color bleed | A | A | A | A |
| Beading | A | A | A | A |
| Storage Stability | C | C | C | C |
| Fixability | A | A | A | A |
| Blocking | D | D | D | D |

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink and processing liquid set comprising:
   a processing liquid to be applied to a recording medium, the processing liquid comprising a multivalent metal salt; and
   an ink to be applied to an area of the recording medium where the processing liquid has been applied, the ink comprising a urethane resin, a styrene-acrylic resin, and a pigment,
   wherein the following relations are satisfied:
   $0.5 \leq B/C \leq 0.7$, where B represents a static surface tension of the ink and C represents a static surface tension of the processing liquid; and
   $0.5 \leq E/D \leq 0.9$, and $35$ (mN/m) $\leq E \leq 55$ (mN/m), where D represents a dynamic surface tension at 15 ms of the processing liquid and E represents a dynamic surface tension at 1500 ms of the processing liquid.

2. The set according to claim 1, wherein the urethane resin has a volume average particle diameter of from 10 to 30 nm.

3. The set according to claim 1, wherein the styrene-acrylic resin has a volume average particle diameter of from 40 to 60 nm.

4. The set according to claim 1, wherein the multivalent metal salt comprises at least one member selected from the group consisting of magnesium salts and calcium salts.

5. The set according to claim 1, wherein the multivalent metal salt accounts for 10 to 40 percent by mass of the processing liquid.

6. The set according to claim 1, wherein the urethane resin accounts for 1.0 to 5.0 percent by mass of the ink.

7. The set according to claim 1, wherein the styrene-acrylic resin accounts for 1.0 to 10.0 percent by mass of the ink.

8. The set according to claim 1, wherein the ink comprises a surfactant represented by the following Chemical formula 1, $$C_6F_{13}-CH_2CH_2O(CH_2CH_2O)_nH \qquad \text{Chemical formula 1}$$

where n represents an integer of from 1 to 40.

9. The set according to claim 1, wherein the urethane resin has a glass transition temperature Tg of 60 degrees C. or lower.

10. The set according to claim 1, wherein the following relation is satisfied: $1.5 \leq A/B \leq 2$, where A represents a dynamic surface tension at 15 ms of the ink.

11. The set according to claim 1, wherein the following relation is satisfied: $1.5 \leq Y/X \leq 4$, where X represents an initial viscosity of the processing liquid and Y represents a viscosity of the processing liquid at 10 percent moisture evaporation.

12. The set according to claim 1, wherein the ink comprises black ink, cyan ink, and yellow ink.

13. An image forming method, comprising:
   applying a processing liquid to a recording medium; and
   applying ink to an area of the recording medium where the processing liquid has been applied,
   wherein the processing liquid comprises a multivalent metal salt and the ink comprises a urethane resin, a styrene-acrylic resin, and a pigment, and
   wherein the following relations are satisfied:
   $0.5 \leq B/C \leq 0.7$, where B represents a static surface tension of the ink and C represents a static surface tension of the processing liquid; and
   $0.5 \leq E/D \leq 0.9$, and $35$ (mN/m) $\leq E \leq 55$ (mN/m), where D represents a dynamic surface tension at 15 ms of the processing liquid and E represents a dynamic surface tension at 1500 ms of the processing liquid.

14. The image forming method according to claim 13, wherein the urethane resin has a volume average particle diameter of from 10 to 30 nm.

15. The image forming method according to claim 13, wherein the styrene-acrylic resin has a volume average particle diameter of from 40 to 60 nm.

16. The image forming method according to claim 13, wherein the multivalent metal salt comprises at least one member selected from the group consisting of magnesium salts and calcium salts.

17. The image forming method according to claim 13, wherein the multivalent metal salt accounts for 10 to 40 percent by mass of the processing liquid.

18. The image forming method according to claim 13, wherein the urethane resin accounts for 1.0 to 5.0 percent by mass of the ink.

19. The image forming method according to claim 13, wherein the styrene-acrylic resin accounts for 1.0 to 10.0 percent by mass of the ink.

20. A image forming device, comprising:
a processing liquid;
an ink;
a processing liquid application device configured to apply the processing liquid to a recording medium; and
an ink application device configured to apply the ink to an area of the recording medium where the processing liquid has been applied,
wherein the processing liquid comprises a multivalent metal salt and the ink comprises a urethane resin, a styrene-acrylic resin, and a pigment, and
wherein the following relations are satisfied:
   $0.5 \leq B/C \leq 0.7$, where B represents a static surface tension of the ink and C represents a static surface tension of the processing liquid; and
   $0.5 \leq E/D \leq 0.9$, and $35 \text{ (mN/m)} \leq E \leq 55 \text{ (mN/m)}$, where D represents a dynamic surface tension at 15 ms of the processing liquid and E represents a dynamic surface tension at 1500 ms of the processing liquid.

* * * * *